June 30, 1925.
E. H. BELDEN
1,543,818
VEHICLE BODY
Filed Aug. 26, 1920
4 Sheets-Sheet 2
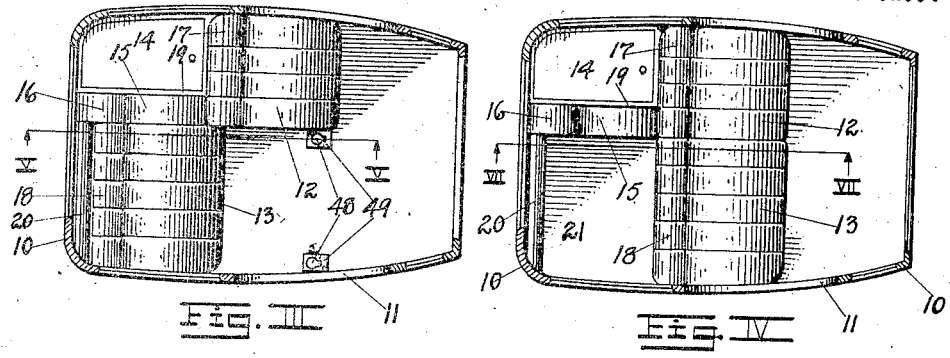
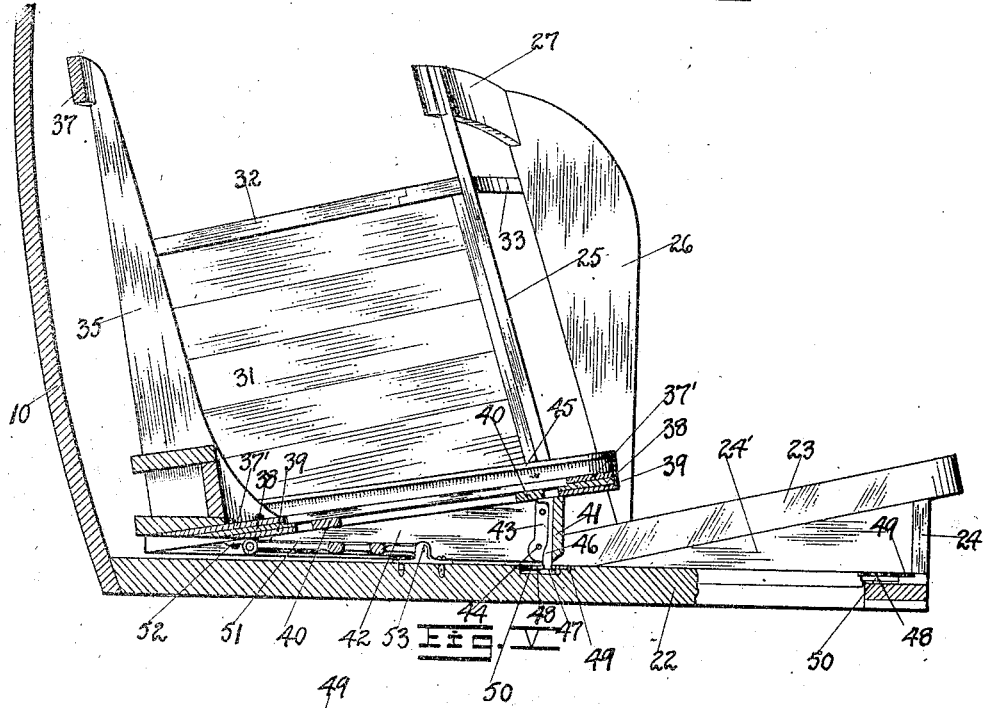
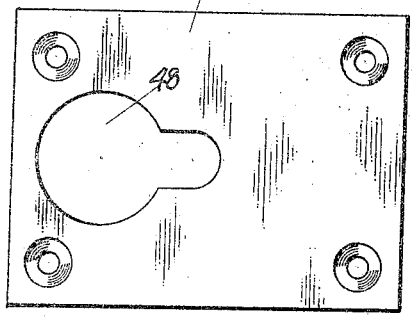
INVENTOR.
Edward H. Belden
BY Chester W. Braselton
Harry W. Lindsey Jr.
ATTORNEY

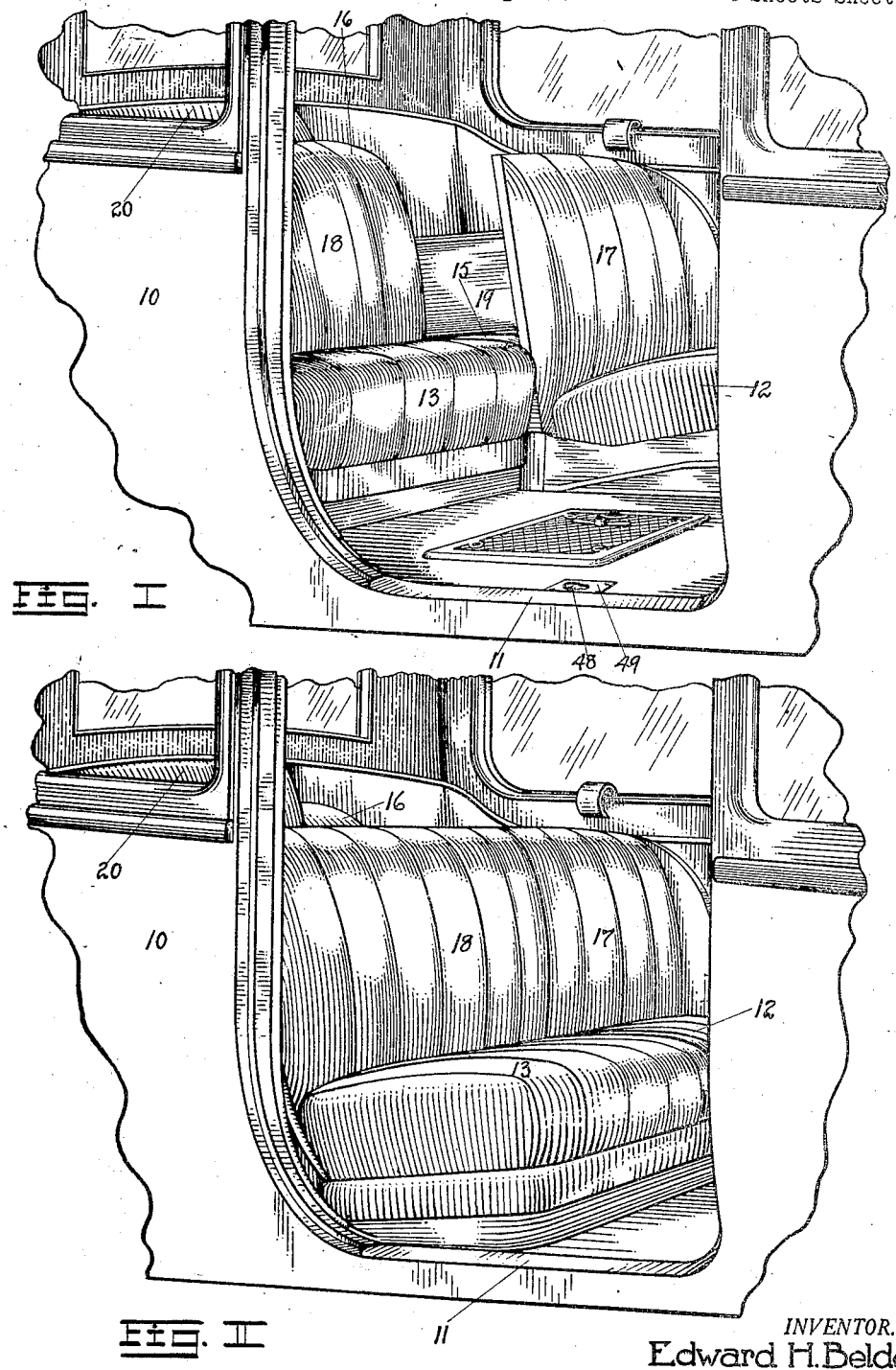

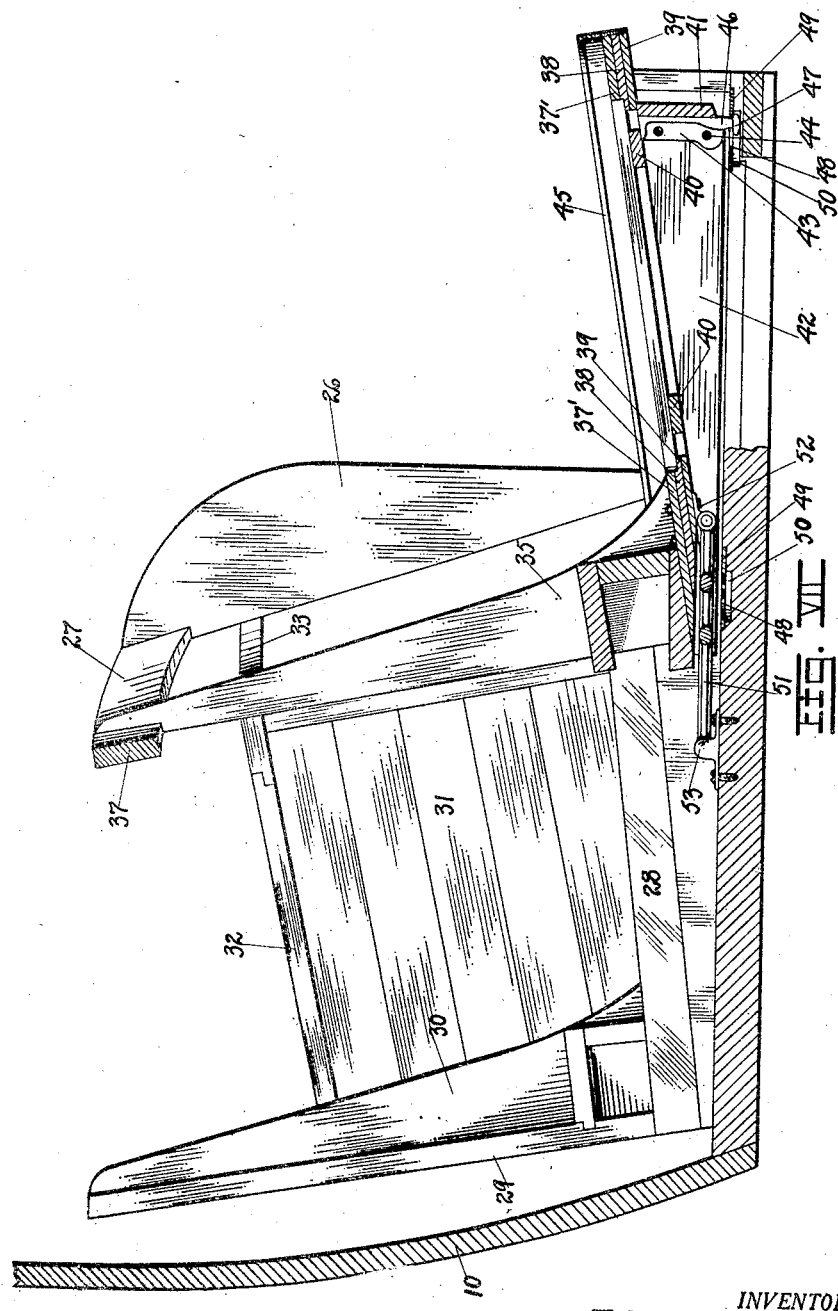

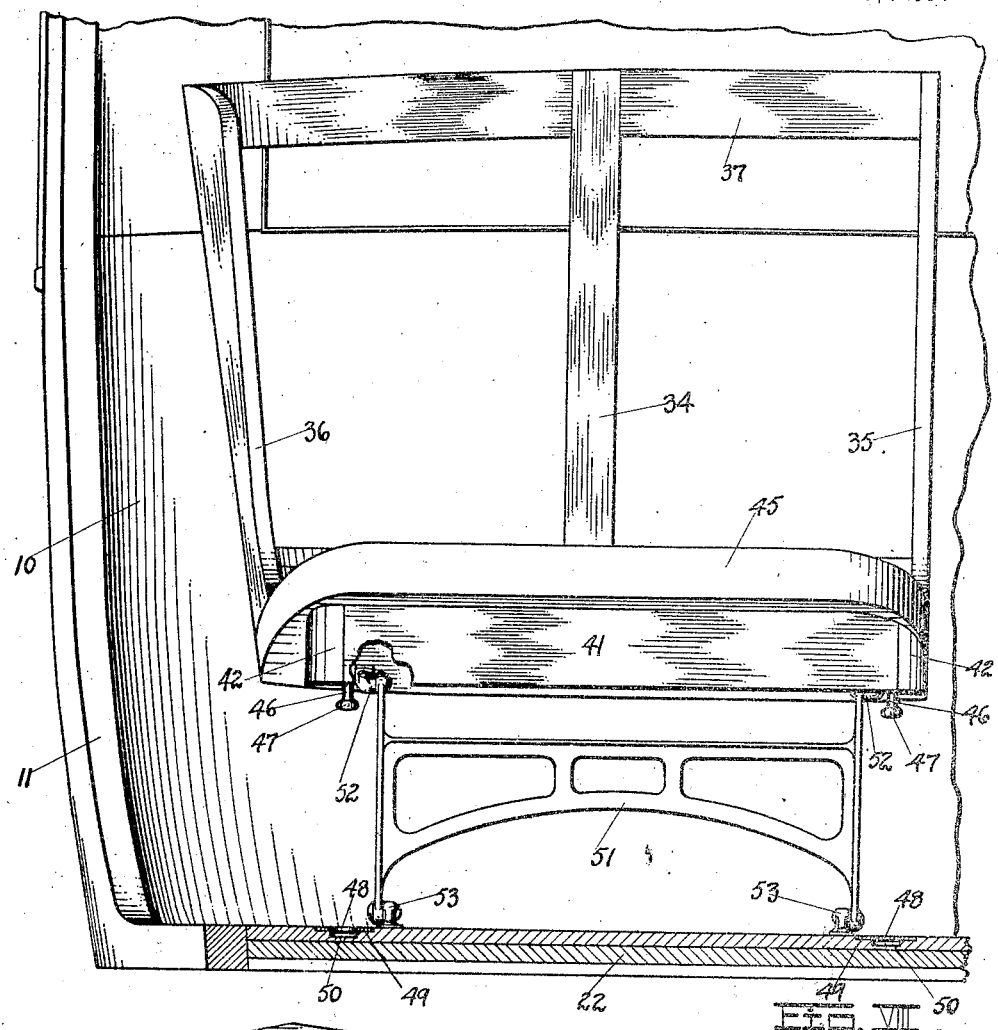
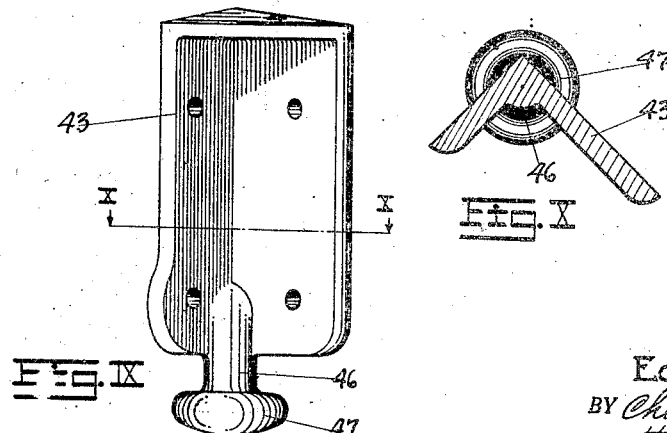

Patented June 30, 1925.

1,543,818

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

VEHICLE BODY.

Application filed August 26, 1920. Serial No. 406,186.

*To all whom it may concern:*

Be it known that I, EDWARD H. BELDEN, a citizen of the United States, residing at Toledo, in the county of Lucas, State of Ohio, have invented certain new and useful Improvements in Vehicle Bodies, of which I declare the following to be a full, clear, and exact description.

My invention relates to vehicle bodies and has for its object to provide an improved seating arrangement for different types of vehicles.

Another object of the invention is to provide a vehicle body normally arranged to seat three passengers and constructed in such a manner as to be convertible into a two passenger vehicle.

A further object of the invention is to provide a vehicle body having a front driver's seat and a rear divided seat normally affording space for two persons, one portion of said divided seat being fixed and the other adapted for adjustment into alignment with said front driver's seat to form a continuation thereof.

A further object of the invention is to provide a vehicle body having a front stationary seat with a storage compartment in the rear thereof and a rear seat normally in alignment with said storage compartment and adjustable into alignment with said front seat to form a continuation thereof.

Another object of the invention is to provide a vehicle body having a front driver's seat with a storage compartment in the rear thereof of less width than said driver's seat and a rear two passenger seat comprising a relatively fixed portion extending from said compartment into alignment with said front driver's seat and a movable portion normally co-extensive therewith and movable into alignment with the driver's seat to form a continuation thereof.

A further object of the invention is to provide a vehicle body having a front seat and a rear seat adapted to be swung into alignment with the front seat, said rear seat having releasable supporting means at one side thereof and a pivotal connection at the opposite side permitting said seat to be swung into and out of alignment with the front seat, said releasable supporting means being movable to release position only by swinging the seat upon its pivotal connection to a predetermined position with respect to the body.

Further objects of the invention relate to the details of construction, arrangement of parts and combinations of elements disclosed herein, although it is to be understood that the invention is not limited to the particular construction shown but contemplates broadly any arrangement for attaining the desired end as well as all forms of construction falling within the scope of the appended claims.

A construction constituting one embodiment of the invention is illustrated in the accompanying drawing forming a part of this specification in which:

Figure I is a fragmentary view in perspective illustrating the normal seating arrangement of the vehicle as it appears when adapted to carry three persons.

Figure II is a fragmentary view in perspective with the rear seat moved into alignment with the front seat whereby a single and continuous seat is afforded for accommodating two persons.

Figure III is a sectional plan with the seats shown in position to seat three persons.

Figure IV is a sectional plan with the seats shown in position to seat two persons.

Figure V is a fragmentary sectional elevation taken on the line V—V of Figure III with the upholstery removed from the seat frames.

Figure VI is an enlarged detailed plan of one of the floor plates shown in Figure V for receiving the brackets adapted for supporting the front side of the movable seat.

Figure VII is a fragmentary sectional elevation taken on line VII—VII of Figure IV with the upholstery omitted from the seat frames.

Figure VIII is an enlarged fragmentary transverse sectional elevation through the body of the vehicle with the adjustable seat frame in elevated position as it will appear when being moved from the position shown in Figure V to that shown in Figure VII, Figure IX is an enlarged detailed elevation of one of the supporting brackets for the adjustable seat and.

Figure X is a sectional view taken on line X—X of Figure IX.

Like reference characters refer to similar parts throughout the several views of the drawings.

In the embodiment of the invention shown and described herein I have illustrated an improved seating arrangement for vehicles, such as automobiles and the like, and while the invention is specifically adapted for automobiles of the coupé and roadster type, it will be understood that such an arrangement may be used with other types of vehicles as well.

Referring to the drawings 10 represents an automobile body constructed in any approved or preferred manner. Located within the body opposite the side door opening 11 is a front or driver's seat 12 which is preferably stationary but which may be made adjustable if desired.

An adjustable seat 13, normally rearward of the seat 12, is adapted to be moved from the position shown in Figure III to that shown in Figure IV when it is desired to convert the automobile from a three to a two passenger vehicle. At the left of the seat 13 when the latter is in the position shown in Figure III is a fixed upholstered extension therefor which lies between the seat 13 and the compartment 14 in rear of the seat 12 as indicated in Figure III. The extension for the seat 13 preferably comprises an upholstered unit or units conforming in contour to the inner end of the seat 13, both as regards to the seat proper and the back therefor, said extension comprising the horizontally disposed portion 15 and the upstanding back portion 16 as indicated in Figures I and III. The seats 12 and 13 are provided respectively with the upholstered backs 17 and 18 and when the movable seat 13 is brought into the position shown in Figures II and IV the back of the two seats and the cushions as well are perfectly aligned and form, in appearance, a single and continuous upholstered seat capable of seating two persons. The stationary upholstered portions 15 and 16 of the seat 13 are placed adjacent the compartment 14 and may be secured to the wall 19 thereof, which is also preferably upholstered, and which extends slightly above the cushion of the seat 13 as indicated in Figure I. The top of the compartment 14, which is provided with a hinged or removable upholstered cover, may serve as an arm rest for the person occupying the inner portion of the seat 13 when the seats are arranged in the position shown in Figure III. It will be noted that the adjustable seat 13 is wider than the driver's seat 12 and that when in the position shown in Figure III the adjustable and stationary portions of the seat will afford sufficient room to accommodate two persons while the driver occupying the front seat 12 will likewise have ample room with the seats arranged in either of the positions shown in Figures III and IV. The body is preferably upholstered in rear of the seat 13 as indicated at 20 as is also the entire back portion of the seat 13 and when the latter is moved to the position shown in Figure IV an upholstered compartment 21 is formed for storing suit cases or other articles as desired and said compartment may also be utilized for carrying a third passenger, by placing a small chair or stool therein. The frames for the upholstery of the front and rear seats are best illustrated in Figures V, VII and VIII and in the case of the front seat the frame is preferably permanently connected with the body of the car and is supported upon the floor 22 thereof and comprises generally the inclined base 23 beneath which extend the front and side plates 24 and 24' respectively, while the back comprises the upwardly extending and rearwardly inclined side piece 25 connected with the outer side piece 26 by means of the cross rail 27 as shown in Figure V.

The frame for supporting the upholstered unit or units 15 and 16 is clearly indicated in Figure VII and preferably comprises the inclined base 28 from which extends upwardly the back 29 upon which is mounted the forwardly extending brace 30.

The storage compartment 14 preferably comprises an upholstered box formed of transversely and longitudinally running boards 31, suitably connected at their corners and upon which is superimposed a frame for supporting the hinged cover of the box, the frame comprising the side and end rails 32 and 33 respectively. Upholstery of any suitable or preferred kind may be used for covering the above described frames and storage compartment walls, either in the form of detachable units such as the seat cushions, or if preferred, the upholstery may be permanently connected with said parts.

The frame for supporting the upholstery of the adjustable seat, 13 comprises a central upright member 34 and the inner and outer side plates 35 and 36 respectively, which are connected by a top rail 37 as indicated in Figure VIII. The members 34, 35 and 36 extend upwardly from the base of the frame and are connected therewith in any suitable manner, said base frame being made up of a plurality of suitable sections of material, as indicated at 37', 38 and 39, which are preferably glued or otherwise, secured together and which may be connected by the transverse frame members 40, all of which are supported by the front and side base rails 41 and 42 respectively, said base rails being connected at their corners by a metal bracket 43 of triangular construction which forms a supporting leg for the seat base, said bracket being secured to said frame members preferably by means of screws as indicated at 44 in Figure VII. A metallic band 45 extends around the outer edge of the seat frame base to receive and retain the seat cushion in position thereon. The brackets or legs 43 are provided with extensions 46 on their lower extremities, said extensions being provided with enlarged ends 47 which are adapted to be inserted through the openings 48 in the floor or socket plates 49, which are suitably anchored in the recesses 50 formed in the floor 22 of the body as indicated in Figure VII, said enlarged ends 47 engaging the underside of the socket plate 49 to prevent the raising of the front end of the seat when said seat is in the position shown in Figures V and VII. When the movable seat is in either position of adjustment, the lower enlarged ends 47 of the brackets 43 rest upon the floor 22 of the vehicle within the recesses 50 covered by the plates 49, it being understood that the reduced portions 46 of the brackets lie within the narrow portions of the slots 48 when the seat is in either of said normal positions of adjustment, and that upward movement of the front end of the seat is thereby prevented. Adjacent the back side of the base of the adjustable seat is a frame or suitable connection 51 pivoted at its opposite sides to the brackets 52 and 53 which are respectively connected with the adjustable seat and floor of the vehicle as indicated in Figure VII. The frame 51 forms a pivotal link or connection between the floor and rear end of the adjustable seat and normally lies in a horizontal position upon the floor when said seat is in either of its positions of adjustment as indicated in Figures V and VII. With the seat in these positions it is impossible to raise the front end thereof, as the enlarged extremities 47 of the legs 43 serve to prevent upward movement of the seat by contacting with the under sides of the plates 49 and said legs are releasable only after the rear of the seat has been raised to a point to bring the pivotal link or connection 51 in substantially a vertical position or to such a point as will permit the enlarged portion 47 of the legs to register with the openings 48 in the plates 49, at which time said legs may be released from said sockets to permit the seat to be moved rearwardly or forwardly as the case may be into the desired position of adjustment.

While the invention as shown and described herein is admirably adapted to fulfill the objects primarily stated, it will be understood that various changes in form, proportion and minor details of construction may be resorted to without departing from the spirit of the invention as expressed in the appended claims.

Having thus described my invention, what I claim as new is:

1. In a vehicle body, a front seat, a rear seat movable into and out of alignment with the front seat, and a storage compartment in rear of the front seat having a side panel extending upwardly at the left of the rear seat to form one end thereof.

2. In a vehicle body, a front seat, a rear seat adapted to swing into and out of alignment with the front seat, a storage compartment in rear of the front seat, and an extension for said rear seat at the inner end thereof adjacent said storage compartment.

3. In a vehicle body, a front seat, a storage compartment in the rear thereof of less width than said front seat, and a second seat in rear of said front seat comprising a fixed portion extending from said compartment to a point substantially in line with the inner side of said front seat and a movable portion normally co-extensive with said fixed portion and adapted to be moved into alignment with said front seat to form an extension thereof.

4. In a vehicle body, a single front seat, a rear seat, and a transverse frame having two points of connection with said rear seat and two points of connection with the body which permit said rear seat to be swung into and out of alignment with the front seat, and the said rear seat being adapted to form a continuous aligned seat with the said front seat across the full width of the body.

5. In a vehicle body, a single front seat, a rear seat, a transversely extending frame beneath the rear seat pivoted at its opposite ends to said body and to said rear seat, which permits the latter to swing from a rear seating position into a front seating position, and the said rear seat being adapted to form a continuous aligned seat with the said front seat across the full width of the body.

6. In a vehicle body, a single front seat, a rear seat, a transversely extending frame beneath the rear seat pivoted at its opposite ends to said body and to said rear seat to permit the latter to swing from a rear seating position to a front seating position in alignment with the front seat, and means independent of said frame for supporting and securing said rear seat to the floor of the body in either of its positions of adjustment.

7. In a vehicle body, a front seat, a rear seat, a transversely extending frame beneath the rear seat pivoted at its opposite ends to said body and to said rear seat to permit the latter to be swung into and out of alignment with the front seat, and legs extending downwardly from said rear seat and adapted to engage the floor of the body to support said rear seat in either of its positions of adjustment.

8. In a vehicle body, a front seat, a rear seat movable into and out of alignment with said front seat, supporting brackets extending from said rear seat, and means provided upon the body to receive said brackets in either position of adjustment of said rear seat.

9. In a vehicle body, a stationary seat, an adjustable seat movable into and out of alignment with said stationary seat, supporting and anchoring members for said adjustable seat depending therefrom and provided with enlarged portions on their lower extremities, and socket members secured upon the floor of the body to receive and lock said enlarged portions when the seat is in either of its positions of adjustment whereby said seat is firmly held against accidental displacement.

10. In a vehicle body, a driver's seat, an adjustable seat movable into and out of alignment with said driver's seat, plate members secured to the floor of the body having slots with enlargements at one end formed therein, and supporting members depending from said adjustable seat, the extremities of which are enlarged insertable through said enlargements to engage the underside of the plate members at said slots whereby said seat is held against accidental displacement in either of its positions of adjustment.

11. In a vehicle body, a driver's seat, a movable seat adjustable into and out of alignment with said driver's seat, legs depending from said movable seat, and means for securely anchoring the lower extremities of said legs upon the floor of the body in either position of adjustment of said movable seat.

12. In a vehicle body, a driver's seat, a movable seat adjustable into and out of alignment with said driver's seat, said movable seat having front and side supporting rails, brackets forming legs for said movable seat and serving to connect said front and side rails, and means adapted to anchor said legs to the floor of the vehicle when said movable seat is in different positions of adjustment.

13. In a vehicle body, a relatively fixed seat, a movable seat, a pivoted member connecting said movable seat with the body and permitting it to swing into and out of alignment with the fixed seat, and releasable means serving to connect said movable seat with the body, said means being releasable only after said seat has been swung out of normal position.

14. In a vehicle body, a relatively fixed seat, a movable seat adapted to be swung into and out of alignment with said fixed seat, and releasable means connected with the body for supporting said movable seat, said means being releasable only after said movable seat has been swung out of normal position.

15. In a vehicle body, a relatively fixed seat, a movable seat adapted to be swung into and out of alignment with said fixed seat, a pivoted connection between the movable seat and floor of the vehicle arranged to lie substantially in a horizontal position adjacent the floor when said movable seat is in either of its normal positions of adjustment, and a releasable connection between said movable seat and said body capable of being released only after said movable seat has been swung out of normal position.

16. In a vehicle body, a relatively fixed seat, a movable seat adapted to be swung into and out of alignment with said fixed seat, and a releasable member connecting said movable seat with the body, said member being releasable only by swinging the movable seat out of normal position.

17. In a vehicle body, a relatively fixed seat, a movable seat, a member having one end pivoted upon the body and the other pivotally connected with said movable seat adjacent the back side thereof and permitting the movable seat to be swung into and out of alignment with said fixed seat, and releasable means connecting the front of said movable seat with the body, said means being brought to release position only by raising the rear of said movable seat.

18. In a vehicle body, a relatively fixed seat, a movable seat, a member having one end pivoted upon the body and the other pivotally connected with said movable seat adjacent one side thereof and permitting the movable seat to be swung into and out of alignment with said fixed seat, a supporting leg at the opposite side of said movable seat, and means connecting said leg with said body and permitting it to be released only by swinging said movable seat out of normal position.

19. In a vehicle adapted to seat a plurality of persons, a driver's seat, a narrow seat section rearward of said driver's seat, and means for changing the normal seating capacity of said vehicle comprising a movable seat section, said section in one position forming a continuation of said narrow seat section, and in another position forming a continuation of said driver's seat.

20. In a vehicle, a stationary front seat, a narrow stationary section contiguous to and rearward of said front seat, and a movable seat adapted in one position to form a continuation of said narrow seat section, and in another position to form a continuation of said front seat whereby said vehicle is adapted to provide seating accommodation respectively for three or two persons.

21. In a vehicle, a shiftable seat having a forward and rearward seating position, means pivoted to said vehicle and to the rear portion of said seat for guiding the same, means for locking down the front portion of said seat when in either of its two positions, and releasable by an upward movement of the rear of said seat.

22. In a vehicle, a shiftable seat having a forward and rearward seating position, a bracket pivotally connecting the rear portion of said seat to said vehicle, interlocking means carried by said vehicle and the forward portion of said seat for preventing upward movement of the front of said seat when in either of its two positions, said means being automatically released by an upward movement of the rear of said seat.

In testimony whereof I affix my signature.

EDWARD H. BELDEN.